United States Patent
Shri

(10) Patent No.: US 9,189,475 B2
(45) Date of Patent: Nov. 17, 2015

(54) INDEXING MECHANISM (NTH PHRASAL INDEX) FOR ADVANCED LEVERAGING FOR TRANSLATION

(75) Inventor: Apurv Raj Shri, Andhra Pradesh (IN)

(73) Assignee: CA, Inc., New York, NY (US)

(\*) Notice: Subject to any disclaimer, the term of this patent is extended or adjusted under 35 U.S.C. 154(b) by 1343 days.

(21) Appl. No.: 12/488,941

(22) Filed: Jun. 22, 2009

(65) Prior Publication Data

US 2010/0324885 A1    Dec. 23, 2010

(51) Int. Cl.
G06F 17/27    (2006.01)
G06F 17/28    (2006.01)

(52) U.S. Cl.
CPC .......... G06F 17/2872 (2013.01); G06F 17/271 (2013.01)

(58) Field of Classification Search
CPC ............. G06F 17/289; G06F 17/2872; G06F 17/2827; G06F 17/2836; G06F 17/2735; G06F 17/2818; G06F 17/2755; G06F 17/271; G06F 17/30864; G06F 3/0611; G06F 17/30616; G06F 17/2881; G06F 17/30011; G06Q 30/0283
USPC ............. 704/2, 4, 5, 7, 9; 707/711, 729, 230, 707/750
See application file for complete search history.

(56) References Cited

U.S. PATENT DOCUMENTS

| | | | | |
|---|---|---|---|---|
| 5,060,155 A | * | 10/1991 | van Zuijlen | 704/9 |
| 5,523,946 A | * | 6/1996 | Kaplan et al. | 704/2 |
| 5,724,593 A | | 3/1998 | Hargrave, III et al. | |
| 5,848,385 A | * | 12/1998 | Poznanski et al. | 704/4 |
| 6,131,082 A | | 10/2000 | Hargrace, III et al. | |
| 6,161,083 A | | 12/2000 | Franz et al. | |
| 6,349,276 B1 | * | 2/2002 | McCarley | 704/8 |
| 6,473,729 B1 | | 10/2002 | Gastaldo et al. | |
| 7,207,005 B2 | | 4/2007 | Lakritz | |
| 7,324,936 B2 | * | 1/2008 | Saldanha et al. | 704/9 |
| 7,346,490 B2 | * | 3/2008 | Fass et al. | 704/7 |
| 7,349,840 B2 | * | 3/2008 | Budzinski | 704/9 |
| 7,398,201 B2 | * | 7/2008 | Marchisio et al. | 704/9 |
| 7,848,915 B2 | * | 12/2010 | Gao et al. | 704/2 |
| 2003/0233224 A1 | * | 12/2003 | Marchisio et al. | 704/4 |
| 2004/0034520 A1 | * | 2/2004 | Langkilde-Geary et al. | 704/1 |
| 2004/0049391 A1 | * | 3/2004 | Polanyi et al. | 704/271 |
| 2004/0078190 A1 | * | 4/2004 | Fass et al. | 704/7 |
| 2004/0107088 A1 | * | 6/2004 | Budzinski | 704/10 |

(Continued)

OTHER PUBLICATIONS

Wu. "Grammarless Extraction of Phrasal Translation Examples from Parallel Texts" 1995.*

(Continued)

*Primary Examiner* — James Wozniak
(74) *Attorney, Agent, or Firm* — Myers Bigel Sibley & Sajovec, P.A.

(57) ABSTRACT

An inventive indexing scheme to index phrases and sub-phrases for advanced leveraging for translation is presented. The scheme provides ways to match at various levels, and allows approximate matches. The system and method comprises an index structure comprising at least one phrasal marker and/or at least one sub-phrasal marker, the index structure performing advanced leveraging for translation by matching to previously stored index structures. The index structure can be a tree structure. The markers can contain constituent names, values, and a level number. Each marker can be obtained by parsing a target string, so that the parsing identifies the constituents and levels in the target string.

12 Claims, 6 Drawing Sheets

(56) References Cited

U.S. PATENT DOCUMENTS

| | | | |
|---|---|---|---|
| 2004/0205737 A1* | 10/2004 | Margaliot et al. | 717/143 |
| 2005/0108630 A1* | 5/2005 | Wasson et al. | 715/513 |
| 2005/0137855 A1* | 6/2005 | Maxwell, III | 704/9 |
| 2005/0256698 A1 | 11/2005 | Becks | |
| 2006/0004560 A1 | 1/2006 | Whitelock | |
| 2006/0206304 A1 | 9/2006 | Liu | |
| 2007/0174041 A1* | 7/2007 | Yeske | 704/3 |
| 2007/0239423 A1* | 10/2007 | Miller | 704/2 |
| 2008/0059146 A1 | 3/2008 | Liu | |
| 2008/0103757 A1* | 5/2008 | Washizawa et al. | 704/2 |
| 2009/0055358 A1 | 2/2009 | Tomasic | |
| 2009/0070099 A1 | 3/2009 | Anisimovich et al. | |
| 2009/0106015 A1* | 4/2009 | Li et al. | 704/2 |
| 2009/0228263 A1* | 9/2009 | Kamatani et al. | 704/4 |
| 2009/0240487 A1* | 9/2009 | Shen et al. | 704/9 |
| 2009/0326911 A1* | 12/2009 | Menezes et al. | 704/2 |
| 2010/0179804 A1* | 7/2010 | Dargelas | 704/9 |

OTHER PUBLICATIONS

Lai et al. "Querying and Updating Treebanks: A Critical Survey and Requirements Analysis" 2004.*

Calder. "On aligning trees" 1997.*

Wong et al. "A Flexible Example Annotation Schema: Translation Corresponding Tree Representation" 2004.*

Sharma et al. "Phrase-based Text Representation for Managing the Web Documents" 2003.*

Furuse et al. "Constituent boundary parsing for example-based machine translation" 1994.*

Proszeky. "Translating while Parsing" 2006.*

Hiroshi, Kanayama, Nasukawa Tetsuya, and Watanabe Hideo. "Deeper sentiment analysis using machine translation technology." Proceedings of the 20th international conference on Computational Linguistics. Association for Computational Linguistics, 2004, pp. 1-7.*

Charniak, et al. "Syntax-based language models for statistical machine translation." Proceedings of MT Summit IX. Sep. 2003, pp. 1-7.*

Chiang, et al. "Online large-margin training of syntactic and structural translation features." Proceedings of the Conference on Empirical Methods in Natural Language Processing. Association for Computational Linguistics, Oct. 2008, pp. 224-233.*

Emele, et al. "Ambiguity preserving machine translation using packed representations." Proceedings of the 36th Annual Meeting of the Association for Computational Linguistics and 17th International Conference on Computational Linguistics—vol. 1. Association for Computational Linguistics, 1998, pp. 365-371.*

Chiang, et al. "11,001 new features for statistical machine translation." Proceedings of Human Language Technologies: The 2009 Annual Conference of the North American Chapter of the Association for Computational Linguistics. Association for Computational Linguistics, Jun. 2009, pp. 218-226.*

Pang, et al. "Syntax-based alignment of multiple translations: Extracting paraphrases and generating new sentences."Proceedings of the 2003 Conference of the North American Chapter of the Association for Computational Linguistics on Human Language Technology—vol. 1. Association for Computational Linguistics, Jun. 2003, pp. 1-9.*

* cited by examiner

INDEXING MECHANISM (NTH PHRASAL INDEX) FOR ADVANCED LEVERAGING FOR TRANSLATION

FIELD OF THE INVENTION

The present invention relates generally to translation and more specifically to a system and method for enhancing translation processes.

BACKGROUND OF THE INVENTION

Current localization systems having leveraging capability, such as translation memory (TM) systems, most often apply methodology based on string to string match. The types of fuzzy matches available are based on "levenstein edit distance algorithm" which, in most cases of leveraging, does not work well. For example, even minimal changes in the source string cause leverage failures and require re-translation afresh. These systems do not take into consideration language syntactic and/or semantics.

On the other hand, systems and methods reflecting language and its characteristics are already being used in Machine Translation (MT) systems. Such MT systems have been developed to perform automatic translation, but these systems are costly and require additional investments of time and human resources to train and maintain them. Also such systems use, generally, unstructured ways to fetch/get translations from parallel corpora. Hence there is a need for a translation system incorporating advanced leveraging capabilities to improve the localization infrastructure's overall efficiency.

SUMMARY OF THE INVENTION

An inventive indexing scheme to index phrases and sub-phrases for improving leveraging capability is presented. The inventive scheme enhances translation processes by doing it more efficiently, effectively and quickly through the use of proposed indexing scheme for translation leverage. Since this is an indexing scheme, it can be used by any Data-base application (Standard like Oracle/SQL Server or Custom XML based databases). This indexing scheme is XML based and provides ways to match at various levels. It can be known as nth-phrasal Indexing. Movement can occur down the XML tree dynamically, e.g., in the order of priority from level-1 to subsequent lower levels, depending upon whether matches are round at the main phrase level (level-1) or at sub-phrases levels (level-2, level-3, . . . ) for better efficiency. This indexing scheme also allows for approximate matches.

The present invention advantageously provides a system and method for translation comprising an index structure comprising at least one phrasal marker and/or at least one sub-phrasal marker, the index structure performing advanced leveraging for translation by matching to previously stored index structures. The index structure can be a tree structure. The markers can contain constituent names, values, and a level number. Each marker can be obtained by parsing a target string, so that the parsing identifies the constituents and levels in the target string.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION OF THE INVENTION

Figure 1:
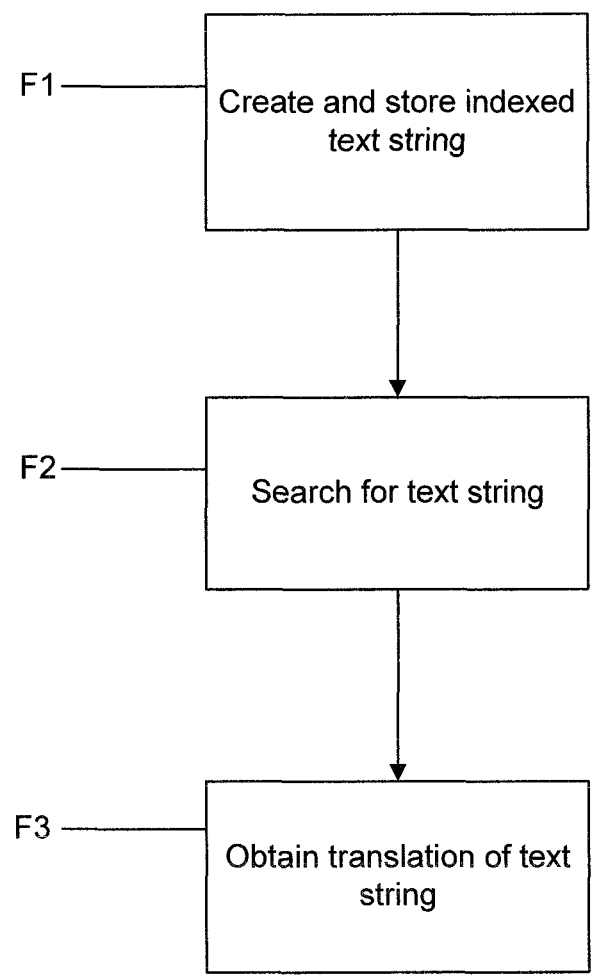
FIG. 1 is a flow diagram of the inventive method.

An inventive solution is presented to the need for a system and method to enhance the translation process by advantageously leveraging the information in TM. As shown in FIG. 1, the inventive method comprises three functions, create F1, search F2 and obtain F3. The Create function F1 creates, using an inventive indexing scheme, and stores in a file and/or in cache memory, a parsed, indexed version of an input text. The Search function F2 searches the indexed text in the file and/or cache memory to obtain a translation. The Obtain function F3 obtains the translation in accordance with the results of the Search function F2.

The indexing scheme facilitates leverage at phrase and sub-phrase levels. The unique index structure contains phrasal markers of all sub-sentences for both English and localized sentences based on their language syntactic to help matching at the lower levels to higher levels if matches are not found with capability of approximate matches. The phrases and sub-phrases are structured to increase the speed and efficiency of search and sort operations, such that the constituents or parts of speech (POS) of sentences can be stored in a tree-like order. These POS can include, for example, nouns (N), verbs (V), pronouns (P), prepositions (Pr), articles (D), verb phrases (VP), noun phrases (NP), adjective phrases (AP), prepositional phrases (PrP), etc.

The index can be tree-structured, and can be performed incrementally over all English and translated strings. Each input string can be represented in a tree form. All data leaves can be numbered from left to right according to depth-first visit of the source and target strings. In one embodiment, this number is an index_entry_range. This numbering will help in uniquely identifying the data leaves referenced by respective indexes.

Figure 2:
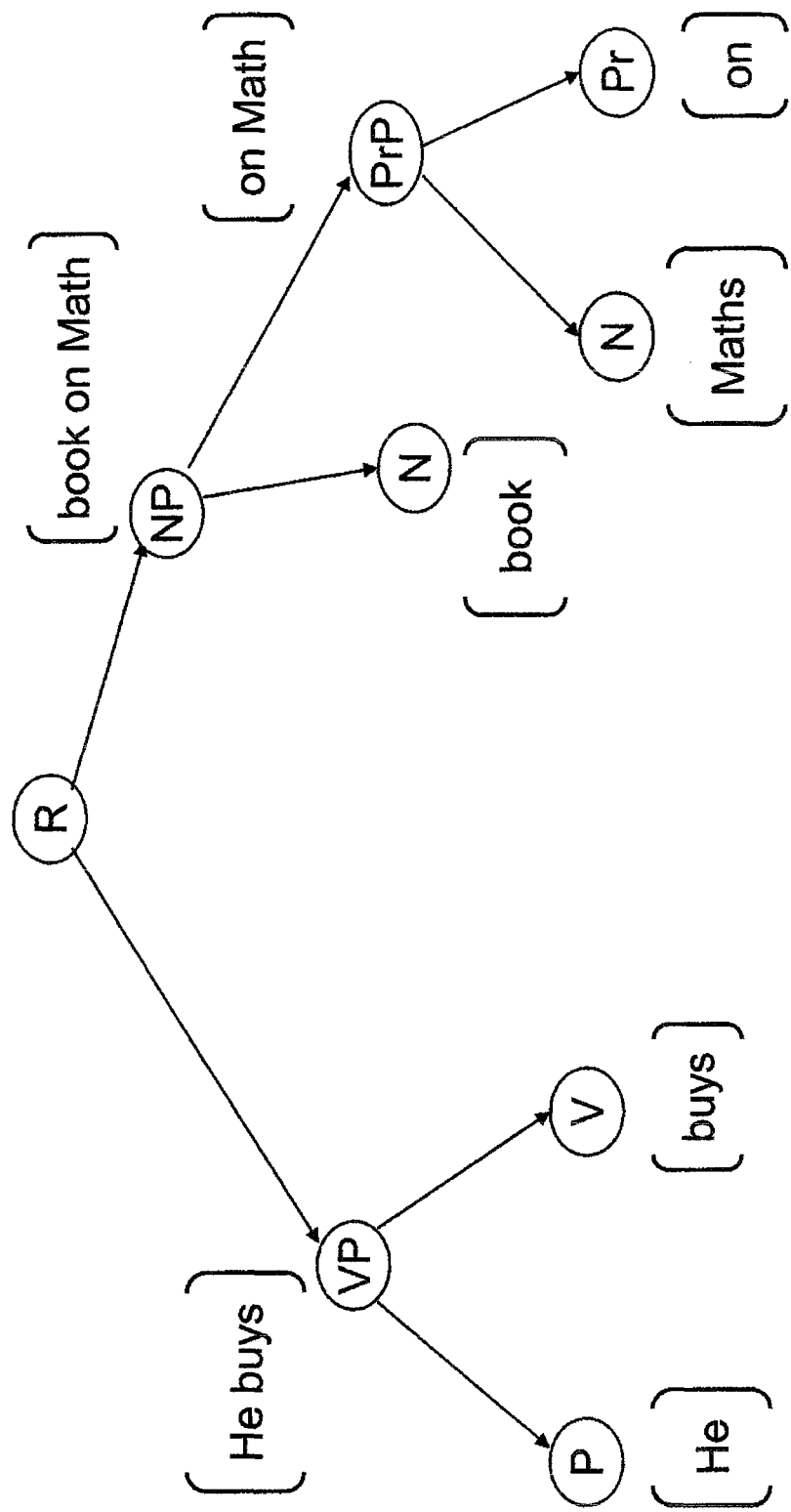
FIG. 2 is an example of indexed text in accordance with the present invention.

FIG. 2 illustrates an indexed tree structure in accordance with the present invention. In the Create function, a parts of speech (POS) tagger tags the parts of speech of the elements of a sentence. FIG. 2 shows the sentence "He buys book on math" in the tree structure after it has been parsed and tagged. In particular, the VP node contains "He buys" and the P subnode of the VP node contains "He" while the V subnode of the VP node contains "buys". The NP node contains "book on math"; its N node contains "book" and its PrP node comprises subnode N containing "math" and subnode Pr containing "on".

In addition to tagging or labeling each node regarding its part of speech, each node or data leaf is numbered from left to right according to depth-first visit of the source and target strings, as discussed above. At the end of the Create function, the tagged string is stored as the index structure in an XML file, and can also be stored in cache memory. Using cache memory improves access time to the index structure.

Figure 3:
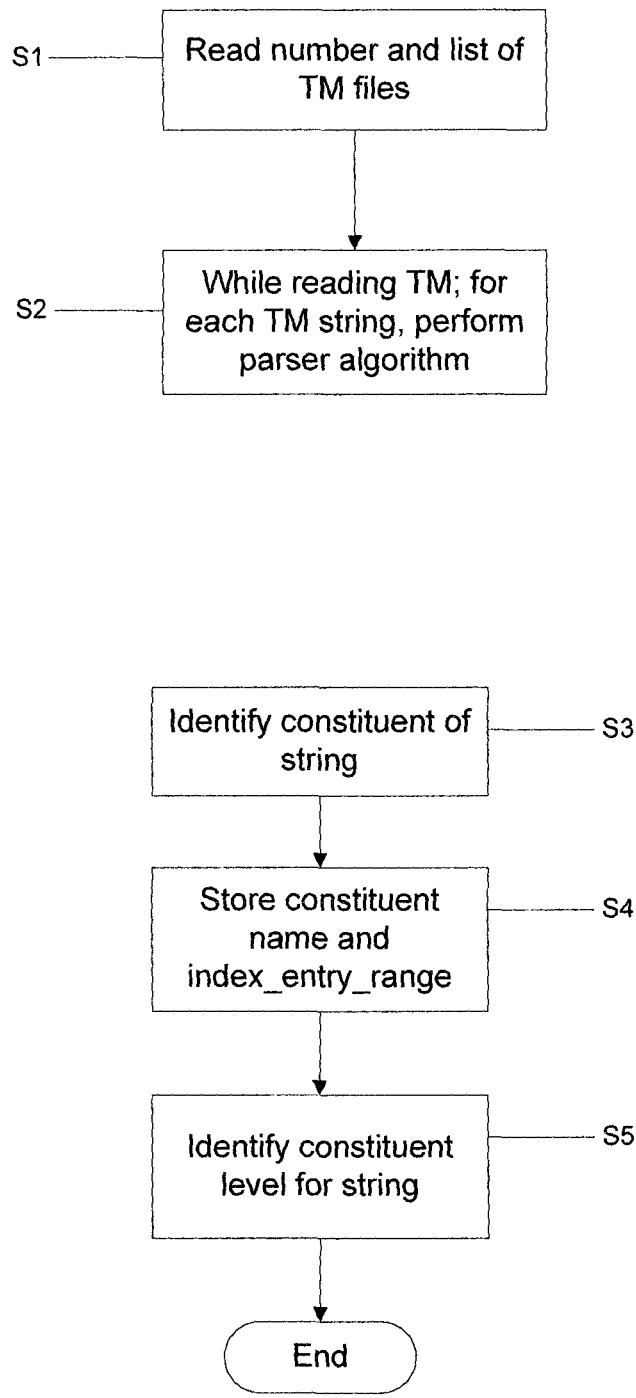
FIG. 3 is a flow diagram of the create function of the inventive method.

FIG. 3 is a flow diagram of the Create feature, including the parser algorithm, in accordance with one embodiment of the inventive method. Initially, in step S1, information, e.g., files, is read from a TM. While reading TM, for each TM string, the parser algorithm is performed in step S2. The parser algorithm is shown in steps S3-S5. In step S3, the constituent of a string is identified. This constituent is stored along with its name and an index_entry_range in step S4. The constituent level for the string is identified in step S5.

Figure 4:
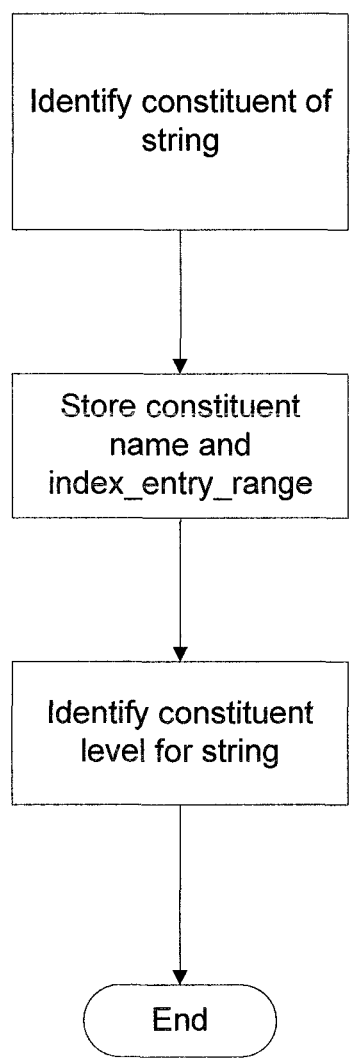
FIG. 4 is a flow diagram of the search function of the inventive method.

FIG. 4 is a flow diagram of the Search algorithm of the Search function. In step S6, the string to be translated is parsed. The respective constituents are looked up in top-down order in the root tree in step S7.

The following example illustrates the translation process in accordance with the inventive system and method.

```
<translation_store>
    <source_string id=1> He buys a notebook</source_string>
    <translated_string id=1>Kare wa noto o kau</translated_string>
    <source_string id=2> I read a book on international
    politics</source_string>
    <translated_string id=2>Watashi wa kokusai seiji nitsuite
    kakareta ho o yomu
</translated_string>
    </translation_store>
```

Figure 5:
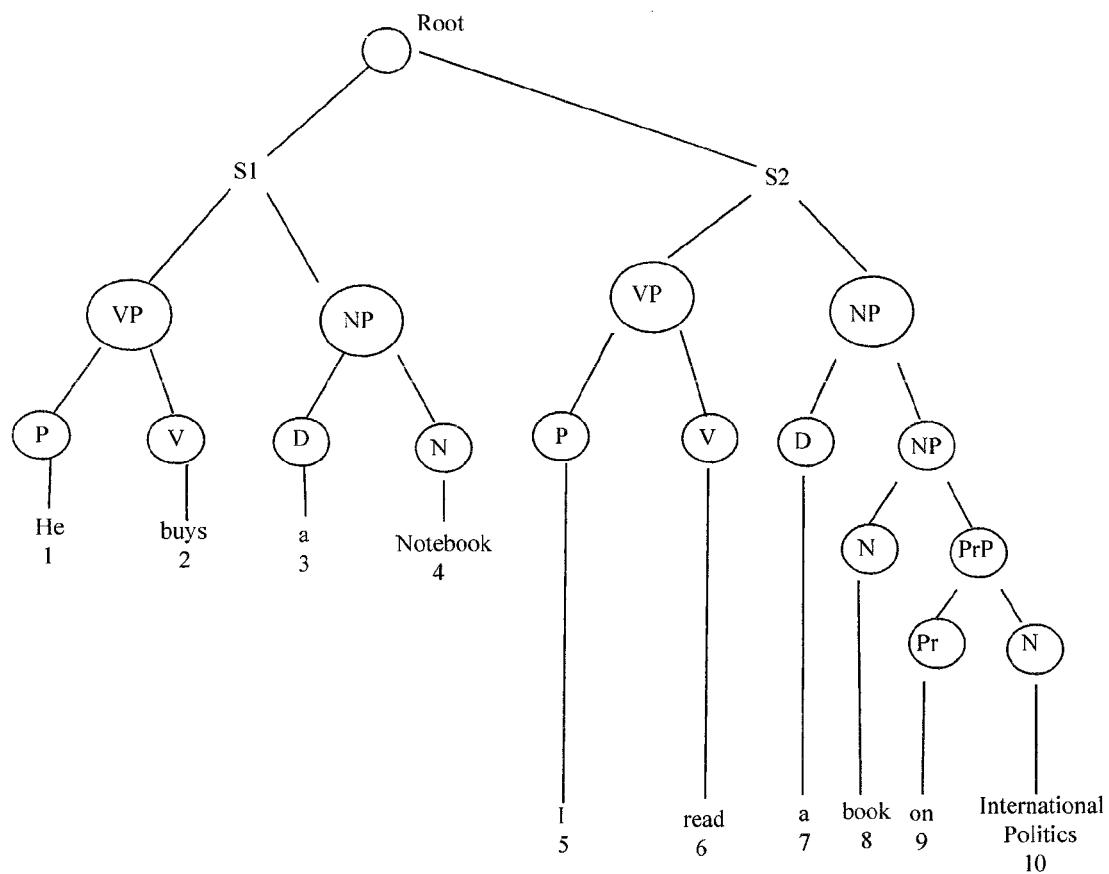
FIG. 5 is another example of indexed text in accordance with the present invention.

Using the Create feature, in this example two strings are parsed, indexed and stored in the inventive indexed structure (translation store) in an XML file. The first string is "He buys a Notebook", and the second string is "I read a book on international politics". FIG. 5 shows source_string id 1 (S1) having VP and NP. VP comprises P containing the word "He" and the level or number "1" and V containing "buys" and "2". NP comprises D containing "a" and "3" and N containing "Notebook" and "4". The source_string id 2 (S2) also has VP and NP. The VP of S2 comprises P containing "I" and "5" and V containing "read" and "6". The NP of S2 comprises D containing "a" and "3" and an additional sub-tree of NP, which comprises N containing "book" and "8". This additional NP sub-tree of S2 further comprises sub-tree PrP comprising Pr containing "on" and "9" and N containing "international politics" and "10".

Figure 6:
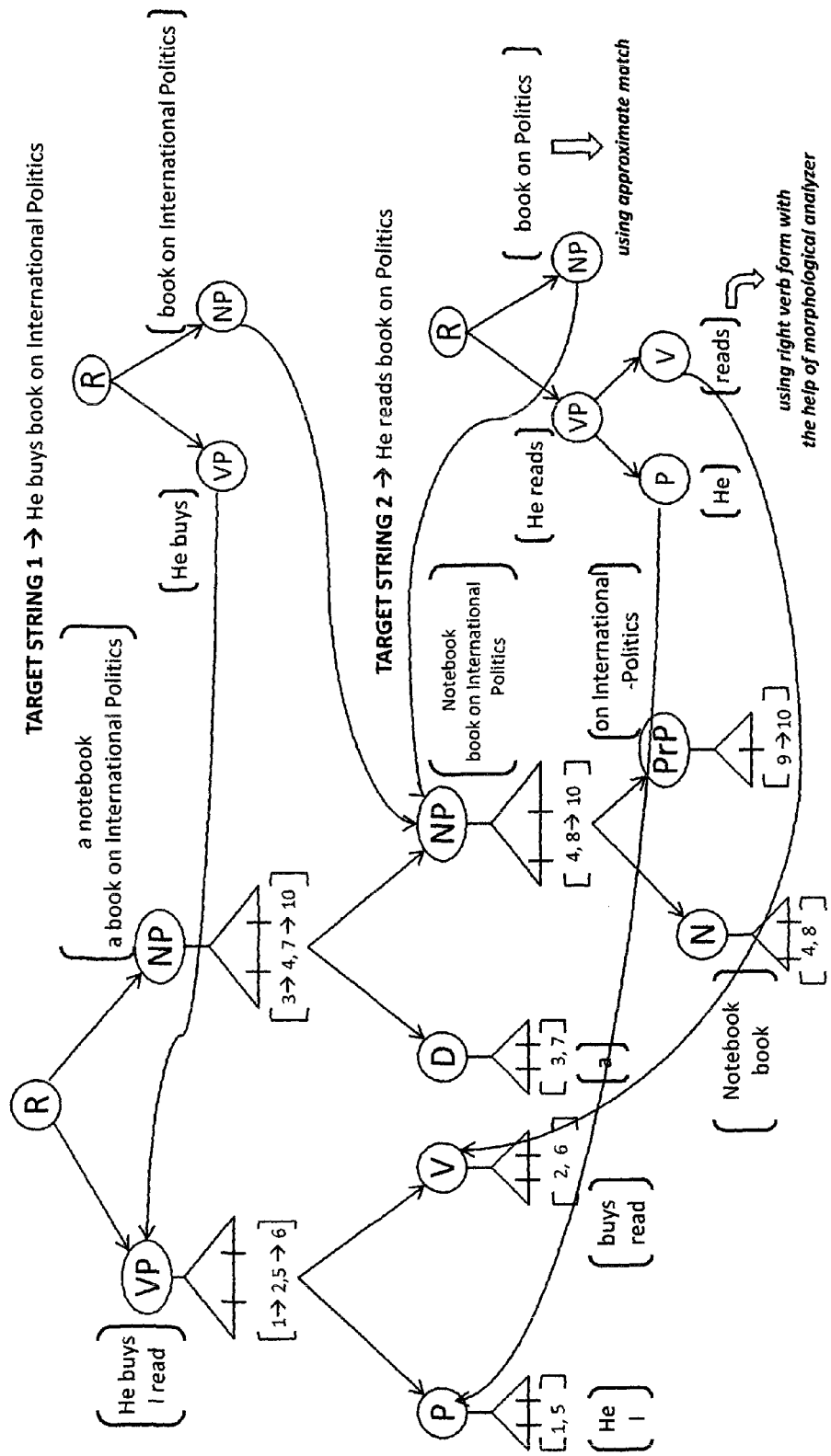
FIG. 6 illustrates the translation process enhanced by the present invention.

FIG. 6 shows the index structure and illustrates the Search function. FIG. 6 illustrates two target strings to be searched for. Target string 1 is "He buys book on International Politics" and target string 2 is "He reads book on Politics". The Search function operates as follows.

Each target string is parsed and its index structure is created in accordance with the Create function. As shown in the upper right of FIG. 6, the index structure of target string 1 has VP comprising "He buys" and NP comprising "book on International Politics". Target string 2, shown in the lower left of FIG. 6, has an index structure comprising VP of "He reads" and NP of "book on Politics".

The upper left index structure in FIG. 6 illustrates the inventive index structure or translation store. It comprises VP of two phrases: "He buys" and "I read", and NP of two phrases "a notebook" and "a book on International Politics".

For target string 1, the inventive method recognizes that its VP is found in the translation store, so that a match is made in the first phrasal level. However, the NP of target string 1 is not found in this first phrasal level. At the next phrasal level, the translation store includes NP comprising D of "a" (referring to both noun phrases, each beginning with "a") and NP of both "notebook" and "book on International Politics". The inventive method matches at this second phrasal level the NP of "book on International Politics" with the NP of target string 1. Note that the translation store contains a third phrasal level, created from the NP of phrasal level two, comprising N of "notebook" and "book" and PrP of "on International Politics".

For target string 2, nothing matches at phrasal level one. However, at phrasal level two, with the VP of "He reads" of target string 2, P of "he" matches and V of "reads" is recognized or understood as matching V "read". A morphological analyzer can be used to obtain the correct verb form. In this example, "read" is recognized as a verb form of "reads". Another important feature is the dynamic parsing of a target string into its sub-phrases, whenever needed. If the match is found at the very first level of target string, the respective sub-phrase will not be parsed further. But if match is not found at a given sub-phrase level, that sub-phrase will be parsed into its atomic constituents further down one layer. This goes on until the translation (complete or approximate) is found.

As discussed above, phrasal level two of the translation store contains NP of "book on International Politics". Target string 2 has NP of "book on Politics". Using an approximate match, the inventive method matches the NP of phrasal level two to the NP of target string 2.

The Search function further determines the following. "He" in target string 1 matches P containing "He" "1" and "He" "5". "buys" in the target string matches V containing "buys" "2". "book" in this target string matches N containing "book" "8". "on International Politics" in this target string matches PrP "on International Politics" "9,10". In this example, for target string 1, the index structure returns an exact match with respect to the phrasal hierarchy. In particular, the structure of target string 1 is node VP with leaves P and V, and node NP with leaf N and node PrP. If an exact match is not available, such as for target string 2, an approximate match can be returned.

Once the search is complete and the phrasal hierarchy is obtained, the translation can be obtained. In the above example, the VP "He buys" is translated as "Kare wa . . . O kau" and the NP "book on International Politics" is translated as "kokusai seiji nitsuite kakareta hon". Thus target string 1 "He buys book on International Politics" is translated as "Kare was kokusai seiji nitsuite kakareta hon O kau".

The invention can be implemented as computer software or a computer readable program for operating on a computer. The computer program can be stored on computer readable medium. Various aspects of the present disclosure may be embodied as a program, software, or computer instructions embodied in a computer or machine usable or readable medium, which causes the computer or machine to perform the steps of the method when executed on the computer, processor, and/or machine.

System and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

While the present invention has been described in particular embodiments, it should be appreciated that the present invention should not be construed as limited by such embodiments, but rather construed according to the below claims.

What is claimed is:

1. A computer program product comprising a non-transitory computer readable medium having computer readable program code embodied therewith, comprising:
    computer readable program code to create an index structure on a computer by parsing a first target string that comprises a first sentence and a second target string that comprises a second sentence that is different from the first sentence;
    computer readable program code to match said index structure to index structures previously stored on the computer; and
    computer readable program code to obtain a translation of the first target string and the second target string corresponding to a match between said index structure and said index structures previously stored on the computer, wherein said index structure comprises phrasal and sub-phrasal markers, each marker having a constituent, a constituent name, and a number that corresponds to numbering each node according to a depth-first visit of the first target string and the second target string,
    wherein parsing the first target string and the second target string comprises dynamically parsing the first target string and the second target string,
    wherein in response to the match being determined at a higher sub-phrase level, a lower sub-phrase level of the higher sub-phrase level is not parsed, and
    wherein the index structure comprises a first phrasal marker corresponding to the first target string and a second phrasal marker corresponding to the second target string.

2. The program code according to claim 1, wherein the structure is a tree structure.

3. The program code according to claim 1, wherein the number is an index_entry_range.

4. The program code according to claim 1, wherein each marker is obtained by parsing the first target string and the second target string.

5. The program code according to claim 4, wherein the parsing identifies the constituent, the constituent name, and the numbers in the first target string and the second target string.

6. The program code according to claim 1, wherein in response to the match not being determined at a higher sub-phrase level, a lower sub-phrase level of the higher sub-phrase level is then parsed.

7. A method for perform advanced leveraging for translation, comprising:
    creating an index structure on a computer by parsing a first target string that comprises a first sentence and a second target string that comprises a second sentence that is different from the first sentence;
    matching said index structure to index structures previously stored on the computer; and
    obtaining a translation of the first target string and the second target string, using the computer, corresponding to a match between said index structure and said index structures previously stored on the computer, wherein said index structure comprises phrasal and sub-phrasal markers, each marker having a constituent, a constituent name, and a number that corresponds to numbering each node according to a depth-first visit of the first target string and the second target string,
    wherein parsing the first target string and the second target string comprises dynamically parsing the first target string and the second target string,
    wherein in response to the match being determined at a higher sub-phrase level, a lower sub-phrase level of the higher sub-phrase level is not parsed, and
    wherein the index structure comprises a first phrasal marker corresponding to the first target string and a second phrasal marker corresponding to the second target string.

8. The method according to claim 7, wherein the structure is a tree structure.

9. The method according to claim 7, wherein the number is an index_entry_range.

10. The method according to claim 7, wherein each marker is obtained by parsing the first target string and the second target string.

11. The method according to claim 10, wherein the parsing identifies the constituent, the constituent name, and the numbers in the first target string and the second target string.

12. The method according to claim 7, wherein in response to the match not being determined at a higher sub-phrase level, a lower sub-phrase level of the higher sub-phrase level is then parsed.

* * * * *